(12) United States Patent
Daizo

(10) Patent No.: US 6,424,654 B1
(45) Date of Patent: Jul. 23, 2002

(54) NETWORK SYSTEM AND DHCP SERVER SELECTION METHOD

(75) Inventor: Satoshi Daizo, Hiratsuka (JP)

(73) Assignee: Komatsu Ltd. (JP)

( * ) Notice: Subject to any disclaimer, the term of this patent is extended or adjusted under 35 U.S.C. 154(b) by 0 days.

(21) Appl. No.: 09/196,363

(22) Filed: Nov. 19, 1998

(30) Foreign Application Priority Data

Nov. 21, 1997 (JP) ............................................. 9-321329

(51) Int. Cl.[7] ................................................. H04L 12/00
(52) U.S. Cl. ..................................................... 370/401
(58) Field of Search ................................. 370/351, 354, 370/471, 401; 709/203, 245, 226

(56) References Cited

U.S. PATENT DOCUMENTS

| | | | | |
|---|---|---|---|---|
| 5,774,660 A | * | 6/1998 | Brendel et al. | 709/201 |
| 5,812,819 A | * | 9/1998 | Rodwin et al. | 703/23 |
| 5,951,634 A | * | 9/1999 | Sitbon et al. | 709/105 |
| 5,968,126 A | * | 10/1999 | Ekstrom et al. | 709/220 |
| 6,009,103 A | * | 12/1999 | Woundy | 370/401 |
| 6,115,752 A | * | 9/2000 | Chauhan | 709/241 |
| 6,175,869 B1 | * | 1/2001 | Ahuja et al. | 709/226 |
| 6,205,477 B1 | * | 3/2001 | Johnson et al. | 709/220 |

FOREIGN PATENT DOCUMENTS

JP   08186569   7/1996

* cited by examiner

Primary Examiner—Salvatore Cangialosi
Assistant Examiner—Ken Vanderpuye
(74) Attorney, Agent, or Firm—Greer, Burns, & Crain, Ltd (57) ABSTRACT

In a network system including a plurality of clients and two or more DHCP servers, each of the clients acquires respective IP addresses from the DHCP servers, finds respective differences between each of the acquired IP addresses and the reference address, selects a DHCP server which assigns an IP address whose distance from the reference address is smallest, and requests use of the IP address to the selected DHCP server.

12 Claims, 7 Drawing Sheets

NETWORK SYSTEM AND DHCP SERVER SELECTION METHOD

BACKGROUND OF THE INVENTION

1. Field of the Invention

The present invention relates to a network system in which IP (Internet Protocol) addresses are managed by a DHCP (Dynamic Host Configuration Protocol) server and a DHCP server selection method, and more particularly, to a network system and a DHCP server selection method, which facilitates management of IP addresses by having each client select its own DHCP server when two or more DHCP servers exist.

2. Description of the Related Art

A network system has been known, in which a DHCP server is provided on the network, and the right to use an IP address is dynamically acquired through the DHCP server when a client network node is started up.

This DHCP server is a server which dynamically assigns IP addresses to each client in accordance with specifications set forth in RFC (Request For Comment) 1531, a standard recommendation of the IAB (Internet Architecture Board).

With such a network system, it is not necessary to establish IP address for each network node, but IP address is assigned only to a node that is in operation. This is advantageous in that IP addresses can be used efficiently, and network management can be simplified.

However, RFC 1531 does not stipulate which DHCP server is selected by each client in a network to which a plurality of DHCP servers are connected.

Consequently, in a network to which a plurality of DHCP servers are connected, there is no way of knowing from which DHCP server a client will acquire an IP address until the client actually starts up a node.

As a result, when each DHCP server has a different manager, the management of IP addresses is complicated, and the advantage of DHCP, that is, facilitating the management of IP addresses, cannot be utilized to its fullest.

For example, when respective LANs (Local Area Network) installed on each floor of an office building are interconnected via IP routers, and a network manager and DHCP server are provided for each LAN, if each DHCP server assigns IP addresses irrespective of the floor, the management of IP addresses will become complex.

For this reason, when two or more DHCP servers are connected to a network, how to specify the DHCP server from which each client acquires an IP address, and how to facilitate IP address management, are important subjects to study.

Furthermore, it is not appropriate to assign management capabilities for clients to the DHCP server side since this requires that registration and updating work be performed for all clients thereby to increase the burden on each network manager.

SUMMARY OF THE INVENTION

Accordingly, an object of the present invention is to provide a network system and DHCP server selection method, which solves for the above-mentioned problems, and which makes management of IP addresses easy by having each client select its own prescribed DHCP server when two or more DHCP servers exist.

To realize the above-mentioned object, the first aspect of the present invention is to provide a network system comprising a network; a plurality of clients which are connected to the network and request respective IP addresses; and a plurality of DHCP servers which are connected to the network and dynamically assign respective IP addresses to each of the clients, wherein each of the clients comprises memory means for storing a reference address; and selection means for selecting a DHCP server from the plurality of DHCP servers based on IP addresses acquired from each of the plurality of DHCP servers and on the reference address stored in the memory means.

The network system so configured as above enables to achieve the effects as follows.

1) Even when a plurality of DHCP servers are installed in the network, each client can always use the IP address assigned by the same DHCP server.
2) IP addresses in each DHCP server can be readily managed.
3) Client can take the initiative in selecting a DHCP server without having to change address data in the DHCP server.

Further, in the network system according to the first aspect of the present invention, the second aspect of the present invention is to provide the network system in which the selection means finds differences between the reference address stored in the memory means and each of the IP addresses, and selects a DHCP server which assigns an IP address which has smallest difference from the reference address.

With this configuration of the selection means, a desired DHCP server can be selected by a simple arithmetic operation.

Further, in the network system according to the second aspect of the present invention, the third aspect of the present invention is to provide the network system in which the memory means stores as a reference address central address of an address space allocated to the DHCP server selected by the selection means.

With this configuration of the memory means, a desired DHCP server can be accurately selected.

Further, in the network system according to the second aspect of the present invention, the forth aspect of the present invention is to provide the network system in which a prescribed gap is provided between address spaces allocated to each of the plurality of DHCP servers, and the memory means stores a previously assigned IP address as a reference address.

With this configuration, a desired DHCP server can be accurately selected even when an address area which consists of successive addresses cannot be allocated to DHCP server.

Further, in the network system according to the second through fourth aspects of the present invention, the fifth aspect of the present invention is to provide the network system in which the selection means selects a DHCP server which assigns an IP address having a bit string whose distance from a bit string forming the reference address is shortest among the plurality of the IP addresses.

With this configuration of the selection means, a desired DHCP server can be selected using a simple arithmetic operation.

Further, in the network system according to the second through fourth aspects of the present invention, the sixth aspect of the present invention is to provide the network system in which the selection means selects a DHCP server which assigns an IP address having a bit string located at a prescribed location whose distance from a bit string located at a prescribed location of the reference address is the shortest among the plurality of the IP addresses.

With this configuration of the selection means, a desired DHCP server can be selected using a simple arithmetic operation.

Further, the seventh aspect of the present invention is to provide a DHCP server selection method in a network system comprising a network to which a plurality of clients which request respective IP addresses and a plurality of DHCP servers which dynamically assign respective IP addresses to each of the clients, are connected, wherein each of the clients performs the steps of acquiring respective IP addresses from the plurality of DHCP servers; finding difference between each of the acquired IP addresses and a reference address; and selecting a DHCP server which assigns an IP address whose distance from the reference address is smallest.

The network system so configured as above enables to achieve the effects as follows.

1) Even when a plurality of DHCP servers are installed in the network, each client can always use the IP address assigned by the same DHCP server.
2) IP addresses in each DHCP server can be readily managed.
3) Client can take the initiative in selecting a DHCP server without having to change address data in the DHCP server.

Further, the eighth aspect of the present invention is to provide a DHCP server selection method in a network system comprising a network to which a plurality of clients which request respective IP addresses and a plurality of DHCP servers which dynamically assign respective IP addresses to each of the clients, are connected, wherein each of the clients performs the steps of broadcasting a Discover packet to each of the plurality of DHCP servers; extracting respective IP addresses from Offer packets returned in response to the broadcasted Discover packet; finding respective differences between each of the extracted IP addresses and a reference address; selecting a DHCP server which assigns an IP address whose obtained difference from the reference address is smallest; requesting use of the IP address by transmitting a Request packet to the selected DHCP server; and receiving an Ack packet returned from the selected DHCP server.

With this configuration of the network system, a desired DHCP server can be selected in accordance with the specifications set forth in RFC 1531.

DESCRIPTION OF THE PREFERRED EMBODIMENTS

An embodiment of the present invention is described below with reference to the accompanying drawings.

Figure 2:
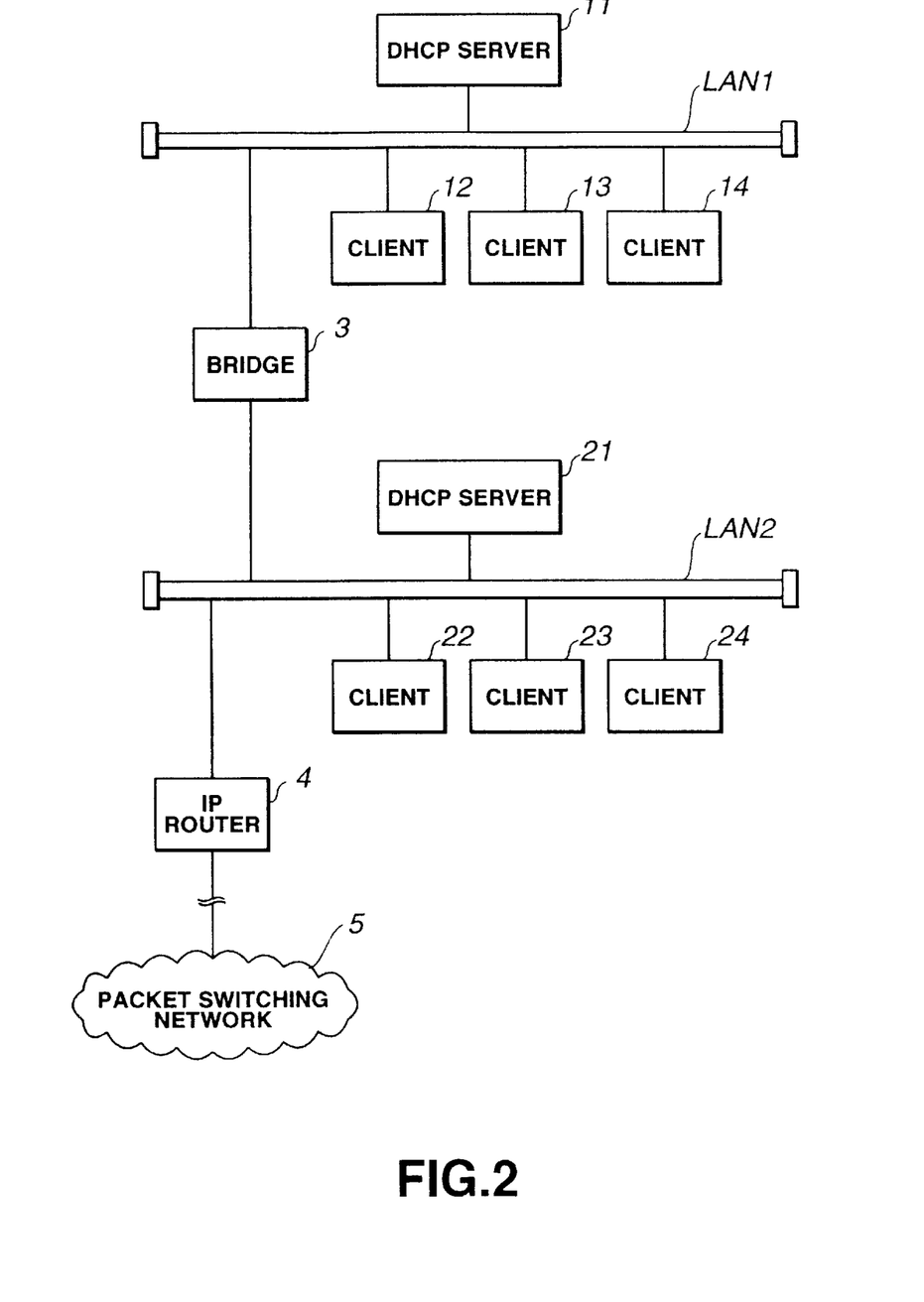
FIG. 2 is a diagram showing the overall configuration of a network system utilized in this embodiment.

FIG. 2 is a diagram showing the overall configuration of a network system utilized in this embodiment.

As shown in FIG. 2, the network system includes a local area network (LAN) 1 to which a DHCP server 11 and clients 12–14 are connected, and a LAN 2 to which a DHCP server 21 and clients 22–24 are connected, the LAN 1 being connected to the LAN 2 via a bridge 3. Further, the LAN 2 is connected to a packet switching network 5 via an IP router 4.

The LAN 1 and 2 are Ethernet that carries out TCP/IP (Transmission Control Protocol/Internet Protocol) communication, in which a specific client is identified from numerous clients linked to an IP internetwork by using an IP address.

The bridge 3 operates at the second layer (data link layer) of the OSI (Open Systems Interconnection) reference model, and the IP router 4 operates at the third layer (network layer) of the OSI reference model.

The DHCP servers 11 and 21 dynamically assign IP addresses in response to requests from each of clients 12–14 and 22–24.

More specifically, when a Discover packet is received from one of the clients, the DHCP server decides the IP address to be assigned to this client from within the address space allocated in advance, and returns an Offer packet, which contains the IP address thus decided.

Then, when the DHCP server receives a request for the use of this IP address from this client in the form of a Request packet, it accepts the request by returning an Ack packet to the client.

In this network system, as a rule, the DHCP server 11 can assign IP addresses not only to the clients 12–14, but also to the clients 22–24, and the DHCP server 21 can assign IP addresses not only to the clients 22–24, but also to the clients 12–14.

However, when it is so designed that a plurality of DHCP servers can assign IP addresses to common clients, the management of these IP addresses becomes complex, and this is not preferable from the standpoint of the system management.

Accordingly, this embodiment is configured so that each client is provided with a server selection function, and each client can selects one of the DHCP servers. According to this embodiment, it is assumed that clients 12–14 receive their IP addresses from DHCP server 11, and clients 22–24 receive their IP addresses from DHCP server 21.

Figure 1:
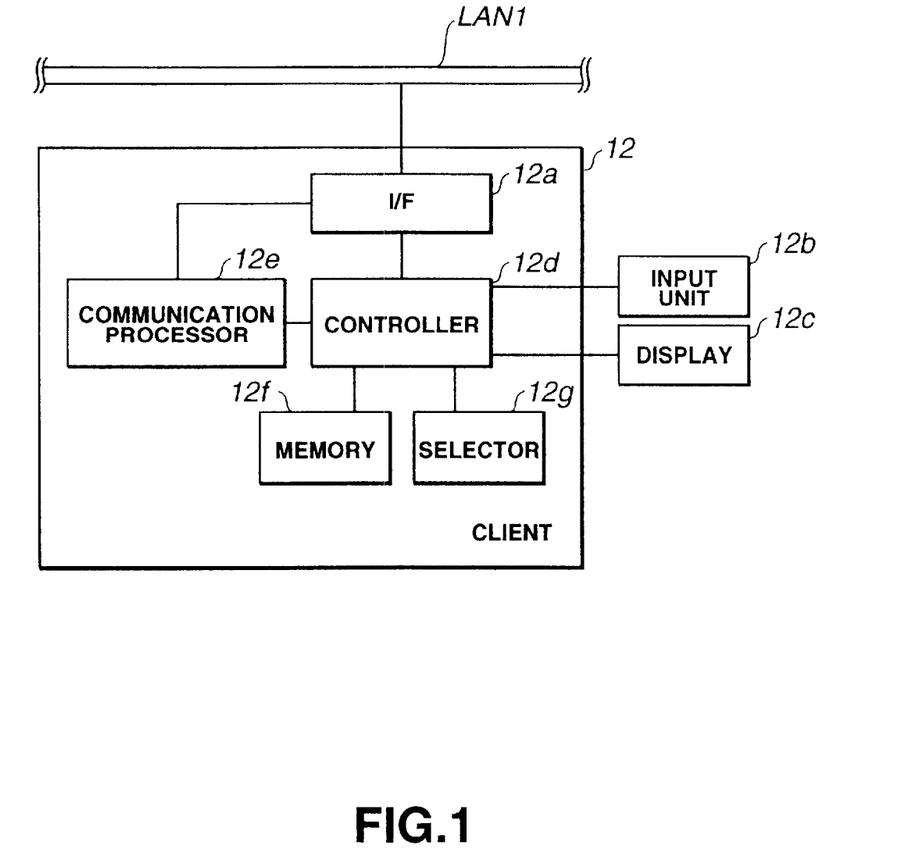
FIG. 1 is a block diagram showing the configuration of a client according to the present invention.

Referring now to FIG. 1, the configuration of the clients is described in which client 12 is taken as an example to explain the configuration.

FIG. 1 is a block diagram showing the configuration of client 12 shown in FIG. 2.

As shown in this figure, client 12 comprises an interface unit (I/F unit) 12a, an input unit 12b, a display unit 12c, a controller unit 12d, a communication processor unit 12e, and a memory unit 12f and a selector unit 12g.

The I/F unit 12a is a processor that controls the communication interface with LAN 1. More specifically, when the I/F unit 12a receives a packet from LAN 1, it outputs this packet to the communication processor unit 12e or the controller unit 12d, and when it receives a transmission packet from the communication processor unit 12e or the controller unit 12d, it attaches a prescribed header, etc. to this transmission packet and outputs it to LAN 1.

The input unit 12b is an input device comprising a keyboard and/or a mouse or the like, and the display unit 12c is a display device comprising a cathode-ray tube or liquid crystal panel or the like.

With regard to the input unit 12b and display unit 12c, the input device and display device of another client can also be used by way of the network via the I/F unit 12a.

The controller unit 12d performs the overall control of client 12. More specifically, it performs the storage and readout of a reference address to and from the memory unit 12f, provides instructions to the communication processor unit 12e for acquiring an IP address, and provides instructions to the selector unit 12g for selecting a DHCP server.

The communication processor unit 12e is a processor that carries out transmission and reception processing for a variety of packets in accordance with specifications set forth in RFC 1531. More specifically, it broadcasts a Discover packet, receives an Offer packet and extracts an IP address, and broadcasts a Request packet and receives an Ack packet.

The memory unit 12f is a storage unit that stores a reference address that is to be compared with each IP address.

Figure 3:
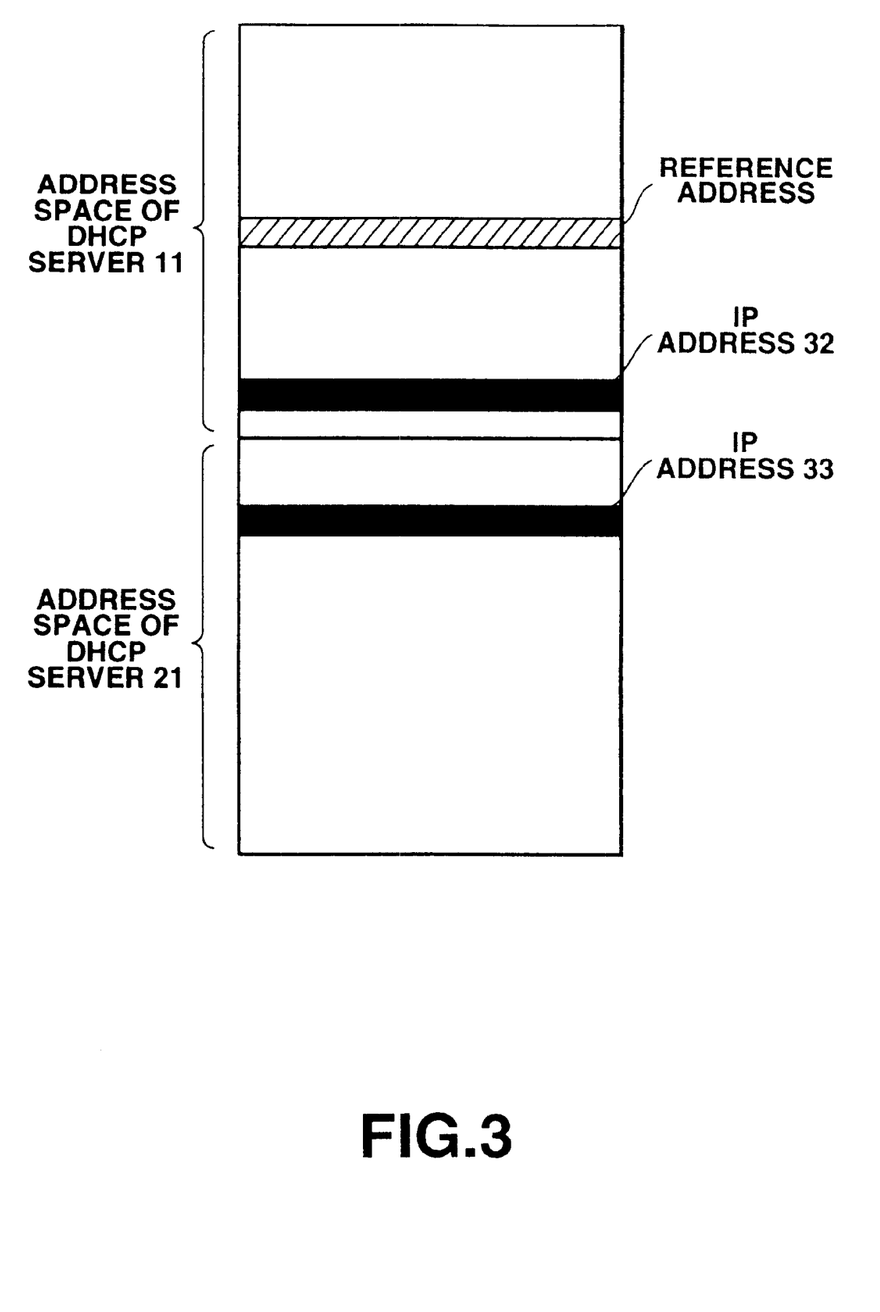
FIG. 3 is a diagram showing the relation between a reference address and IP addresses.

Here, the reference address refers to the central address of the address space allocated to the DHCP server to be selected. For example, if DHCP server 11 is to be always selected, the central address of the address space allocated to DHCP server 11 is set as the reference address 31 as shown in FIG. 3.

The reason for making the central address the reference address like this is because the difference between the IP address 32, which is assigned from DHCP server 11, and the reference address 31 will always be smaller than the difference between the IP address 33, which is assigned from DHCP server 21, and the reference address 31.

The selector unit 12g compares two IP addresses 32 and 33 received from DHCP servers 11 and 21, respectively with the reference address 31 stored in the memory unit 12f and selects one of the DHCP servers for which a client requests permission to use an IP address.

More specifically, the selector unit 12g performs subtraction to find the difference between the reference address 31 and IP address 32 and difference between the reference address 31 and IP address 33 by representing these addresses as decimals, calculates the absolute value of these differences as distance, and selects the DHCP server which offers the IP address with a smaller distance.

Alternatively, the DHCP server can also be selected by considering the IP address as a code word in a Galois field GF(2), calculating the hamming distance between each IP address and the reference address, and selecting the DHCP server with the smallest hamming distance.

For example, in the diagram shown in FIG. 3, since it is apparent that the distance between IP address 32 and reference address 31 will always be shorter than the distance between IP address 33 and reference address 31, client 12 will always select DHCP server 11.

In the above calculation of distance, the distance of all the bits constituting the IP addresses was calculated. However, if the IP addresses differ only in specific bits, it is possible to compare the difference with these specific bits only.

For the client 12 configured as described above, it is possible to always acquires the IP address from DHCP server 11 even if it is connected to LAN 2.

Next, the format of the packets sent back and forth between the client and DHCP server are described.

Figure 4:
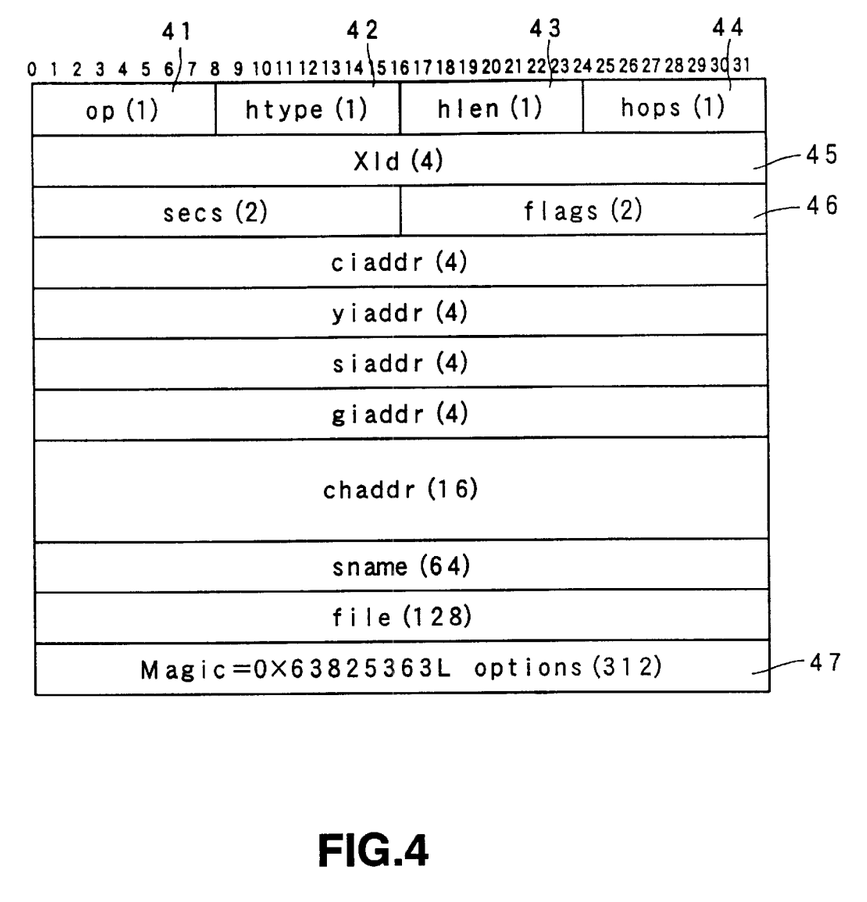
FIG. 4 is a diagram showing a packet format which the client shown in FIG. 1 exchanges with a DHCP server.

FIG. 4 is a diagram showing a packet format, which is sent back and forth between client 12 shown in FIG. 1 and a DHCP server. Discover packet, Offer packet, Request packet and Ack packet are configured in the packet format described below.

As shown in FIG. 4, the packet format comprises an op field 41, which indicates the type of message, an htype field 42, which is the same as the type ARP (Address Resolution Protocol) in the MAC (Media Access Control) layer, an hlen field 43, which indicates the kind of hardware address, a hops field 44, which is used when there is a relay agent, and an xid field 45 for use as a transaction ID. Since a packet format such as this is stipulated in RFC 1531, a detailed description thereof is omitted. Also, an IP address returned by a DHCP server is stored in an option field 47.

Next, the procedures leading up to the acquisition of an IP address by client 12 shown in FIG. 1 are explained.

Figure 5:
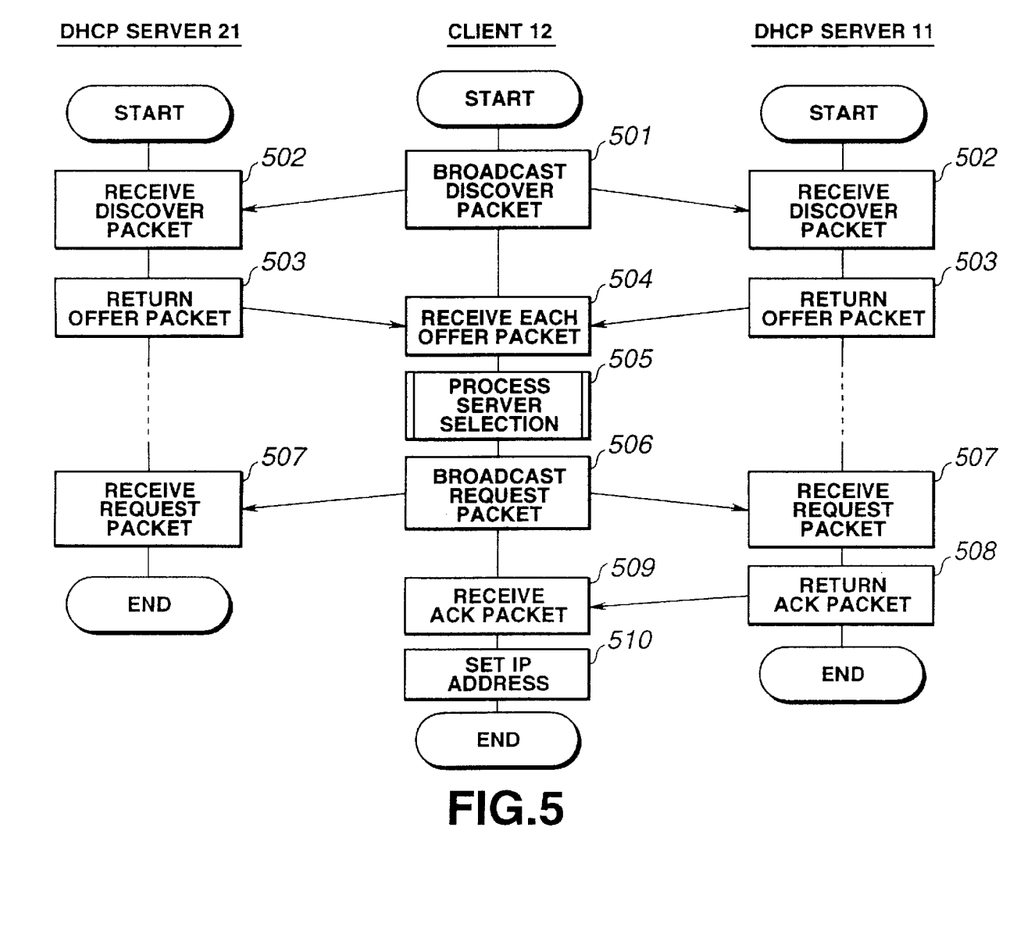
FIG. 5 is a flowchart showing the procedures leading to the acquisition of an IP address by the client shown in FIG. 1.

FIG. 5 is a flowchart showing the procedures leading up to the acquisition of an IP address by client 12 shown in FIG. 1.

As shown in FIG. 5, first of all, when client 12 broadcasts a Discover packet (Step 501), DHCP servers 11 and 21 both receive this Discover packet (Step 502).

Next, DHCP servers 11 and 21 each decide on an IP address to be allocated to client 12, and send Offer packets containing this IP address to client 12 (Step 503).

And then, when client 12 receives each Offer packet (Step 504), it extracts the IP address from each Offer packet, and, using each IP address together with the reference address stored in the memory unit 12f, it carries out processing to select the DHCP server from which to acquire an IP address (Step 505).

Then, if client 12 selects DHCP server 11, this client 12 broadcasts a Request packet over the network, and requests right of use from DHCP server 11 (Step 506).

Then, when DHCP server 21 receives this Request packet (Step 507), because the request is not for its IP address, it terminates processing.

Conversely, when DHCP server 11 receives the Request package (Step 507), because the request is for its IP address, it returns to client 12 an Ack packet, confirming that the request has been granted (Step 508).

Then, when client 12 receives this Ack packet (Step 509), it sets the IP address assigned from DHCP server 11 as the IP address to be used (Step 510), and terminates processing.

Thereafter, client 12 will utilize this IP address to carry out data communication with other clients and various nodes on the Internet, although a detailed explanation thereon is omitted here.

Next, server selection processing indicated in Step 505 of FIG. 5 is explained in more detail.

Figure 6:
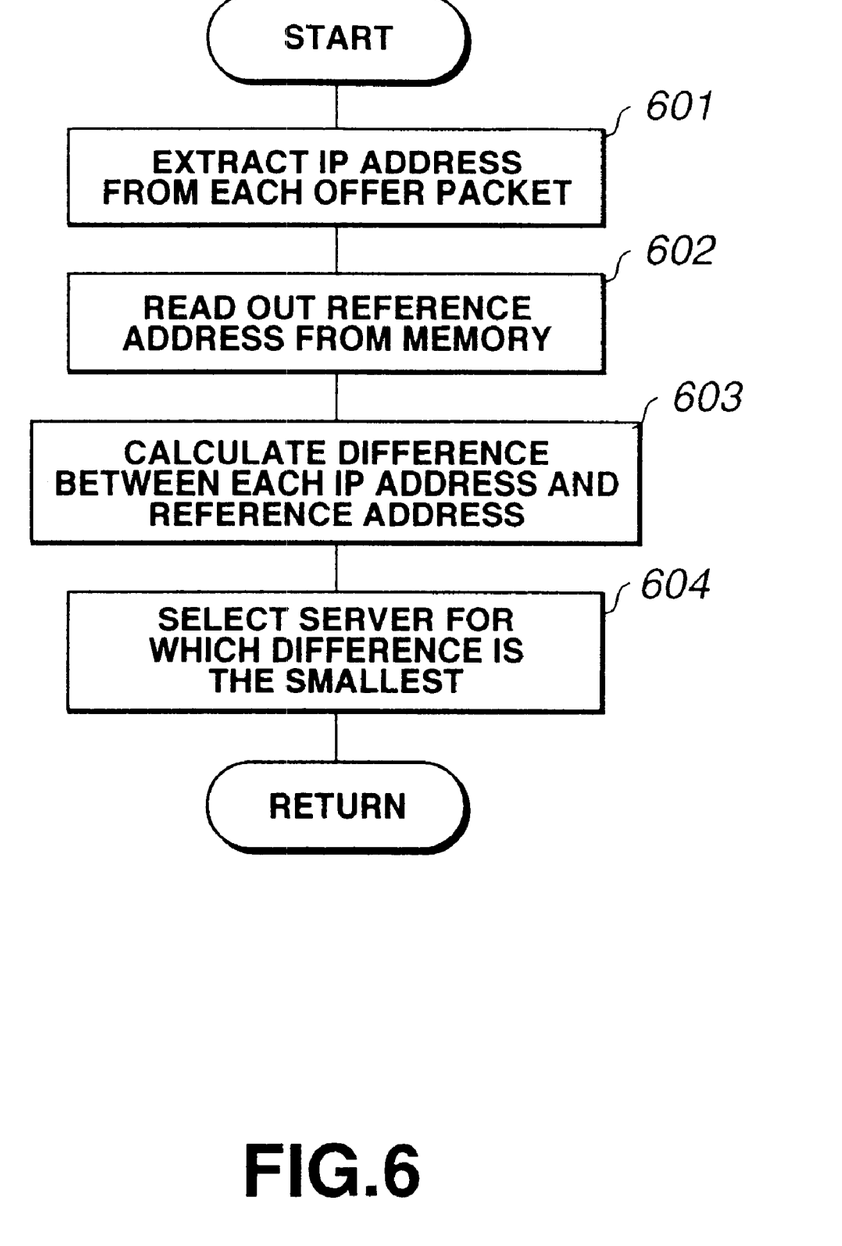
FIG. 6 is a flowchart showing the server selection processing procedures shown in FIG. 5.

FIG. 6 is a flowchart showing the server selection processing procedures indicated in Step 505 of FIG. 5.

As shown in FIG. 6, client 12 extracts the IP addresses from the Offer packets returned by DHCP servers 11 and 21, respectively (Step 601), and then reads out the reference address stored in memory unit 12f (Step 602).

It then calculates the difference between the reference address and each of the IP addresses (Step 603), and selects the DHCP server, for which this difference is the smallest (Step 604).

By performing the series of steps shown in FIG. 5 and FIG. 6 in this fashion, client 12 is always able to acquire an IP address from DHCP server 11.

In the explanation of the above-described sequence, the central address of the address space allocated to the selected DHCP server is used as the reference address, but a client can also establish a previously-used IP address as the reference address.

Figure 7:
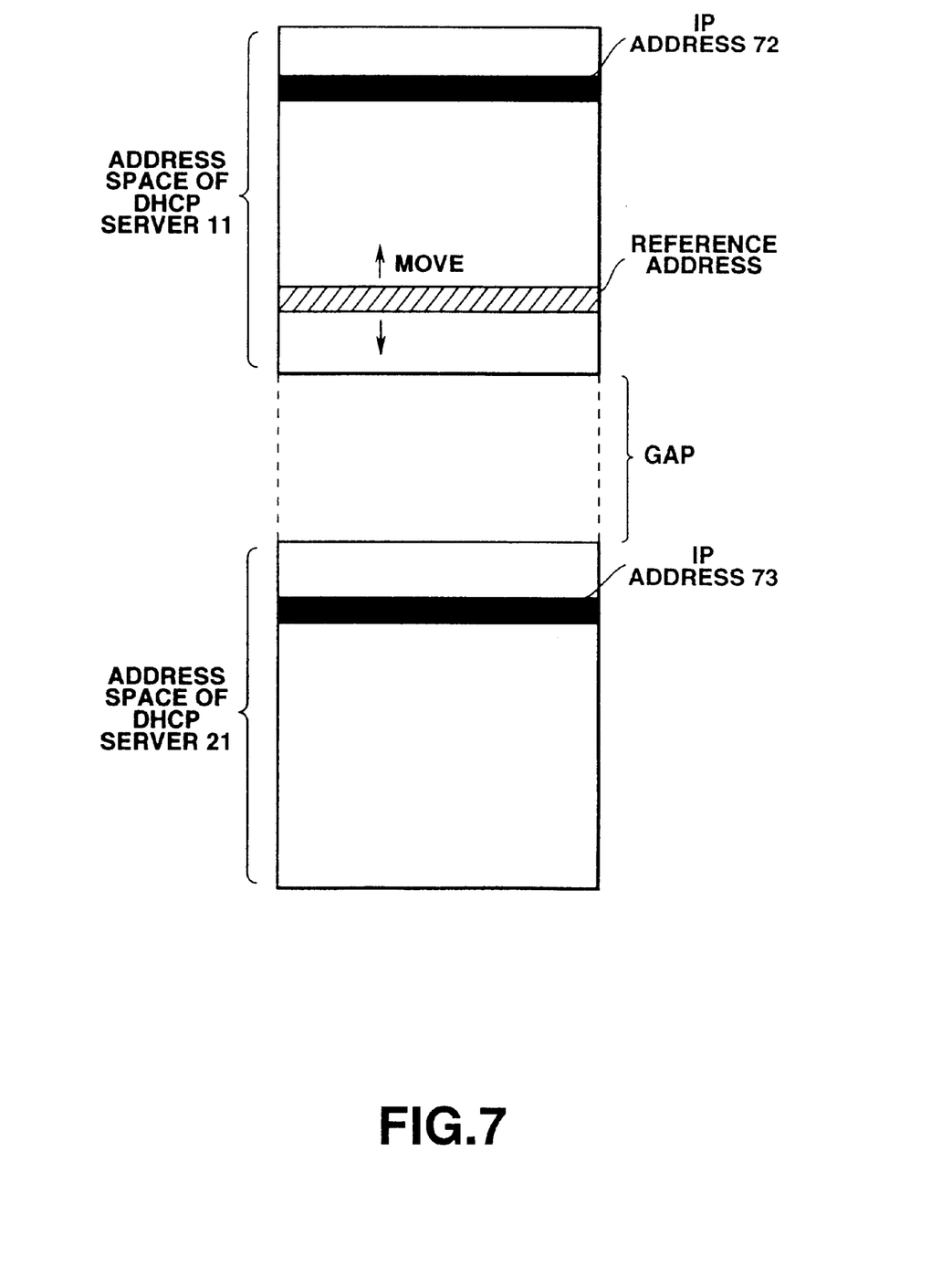
FIG. 7 is a diagram showing the relation between a reference address and IP addresses, when a previously utilized IP address is used as a reference address.

FIG. 7 is a diagram showing the relation between the reference address and IP addresses when a previously-used IP address is set as the reference address.

When a previously-used IP address is set as the reference address, the reference address may change each time throughout the address spaces of all of DHCP servers. However, by providing a gap between the address spaces respectively allocated to the DHCP servers, it is possible to allow the reference address to change within the address space of a specific DHCP server.

Specifically, as shown in FIG. 7, by providing a gap 74 between the address space allocated to DHCP server 11 and the address space allocated to DHCP server 21, the difference between IP address 72 provided by the DHCP server 11 and the reference address 71 will always be smaller than the difference between IP address 73 provided by the DHCP server 21 and the reference address 71. This makes the reference address 71 to change within the address space of DHCP sever 11.

For this purpose, a previously-used IP address is stored in memory unit 12f as a reference address, and the controller unit 12d updates the reference address stored in memory unit 12f each time the IP address is assigned.

As described above, this embodiment is configured so that each client stores a reference address in the memory unit 12f, and when IP addresses are received from DHCP servers 11 and 21, each client finds the respective difference between the reference address and the IP addresses, selects the DHCP server for which this difference is the smallest, and requests the use of the IP address from the selected DHCP server. Therefore, it is possible to achieve the following effects.

1) Even when a plurality of DHCP servers are provided in the network, each client can always use the IP address assigned by the same DHCP server.
2) The IP address in each DHCP server can be readily managed.
3) A client can take the initiative in selecting a DHCP server without having to change address data on the DHCP server.

Although this embodiment describes the network in which two DHCP servers are provided, the present invention is not limited to this, and can also be applied when three or more DHCP servers are provided in the network.

What is claimed is:

1. A network system comprising:
    at least one LAN network;
    a plurality of clients which are connected to the network and request respective IP addresses; and
    a plurality of DHCP servers which are connected to the network and dynamically assign respective IP addresses to each of the clients, wherein each of the clients comprises:
        memory means for storing a reference address; and
        selection means for selecting a DHCP server from the plurality of DHCP servers based on IP addresses acquired from each of the plurality of DHCP servers and on the reference address stored in the memory means.

2. The network system according to claim 1, wherein the selection means finds differences between the reference address stored in the memory means and each of the IP addresses, and selects one of said plurality of DHCP servers which assigns an IP address which has smallest difference from the reference address.

3. The network system according to claim 2, wherein the memory means stores central address of an address space allocated to one of said plurality of DHCP servers to be selected as a reference address.

4. The network system according to claim 2, wherein a prescribed gap is provided between address spaces allocated to each of the plurality of DHCP servers, and the memory means stores a previously assigned IP address as a reference address.

5. The network system according to claim 2, wherein the selection means selects one of said plurality of DHCP servers which assigns an IP address having a bit string whose distance from a bit string forming the reference address is shortest among the plurality of the IP addresses.

6. The network system according to claim 3, wherein the selection means selects one of said plurality of DHCP servers which assigns an IP address having a bit string whose distance from a bit string forming the reference address is shortest among the plurality of the IP addresses.

7. The network system according to claim 4, wherein the selection means selects one of said plurality of DHCP servers which assigns an IP address having a bit string whose distance from a bit string forming the reference address is shortest among the plurality of the IP addresses.

8. The network system according to claim 2, wherein the selection means selects one of said plurality of DHCP servers which assigns an IP address having a bit string located at a prescribed location whose distance from a bit string located at a prescribed location of the reference address is the shortest among the plurality of the IP addresses.

9. The network system according to claim 3, wherein the selection means selects one of said plurality of DHCP servers which assigns an IP address having a bit string located at a prescribed location whose distance from a bit string located at a prescribed location of the reference address is the shortest among the plurality of the IP addresses.

10. The network system according to claim 4, wherein the selection means selects one of said plurality of DHCP servers which assigns an IP address having a bit string located at a prescribed location whose distance from a bit string located at a prescribed location of the reference address is the shortest among the plurality of the IP addresses.

11. A DHCP server selection method in a network system comprising at least one LAN network to which a plurality of clients which request respective IP addresses and a plurality of DHCP servers which dynamically assign respective IP addresses to each of the clients, are connected, wherein each of the clients performs the steps of:
    acquiring respective IP addresses from the plurality of DHCP servers;
    finding the difference between each of the acquired IP addresses and a reference address; and
    selecting one of said plurality of DHCP servers which has the smallest difference from the reference address.

12. A DHCP server selection method in a network system comprising at least one LAN network to which a plurality of clients which request respective IP addresses and a plurality of DHCP servers which dynamically assign respective IP addresses to each of the clients, are connected, wherein each of the clients performs the steps of:

broadcasting a Discover packet to each of the plurality of DHCP servers;

extracting respective IP addresses from Offer packets returned in response to the broadcasted Discover packet;

finding respective differences between each of the extracted IP addresses and a reference address;

selecting one of said plurality of DHCP servers which assigns an IP address whose obtained difference from the reference address is smallest;

requesting use of the IP address by transmitting a Request packet to the selected DHCP server; and receiving an Ack packet returned from the selected DHCP server.

* * * * *